US005590011A

United States Patent [19]

Hein

[11] Patent Number: 5,590,011

[45] Date of Patent: Dec. 31, 1996

[54] SHORT CIRCUIT PROTECTED SPLICE CONNECTOR

[75] Inventor: David A. Hein, Sterling Heights, Mich.

[73] Assignee: Alcoa Fujikura Limited, Brentwood, Tenn.

[21] Appl. No.: 507,920

[22] Filed: Jul. 27, 1995

Related U.S. Application Data

[63] Continuation of Ser. No. 150,967, Nov. 12, 1993.

[51] Int. Cl.[6] .......... H02H 5/04

[52] U.S. Cl. .......... 361/106; 361/58; 361/103

[58] Field of Search .......... 361/57, 58, 87, 361/103, 105, 106, 111, 118, 119, 124, 126, 127; 307/117, 132 T; 439/36, 913, 76.1, 76.2, 732; 337/163–167, 414, 186, 187, 188

[56] References Cited

U.S. PATENT DOCUMENTS 3,839,692 10/1974 Plasko .......... 337/182

5,153,805 10/1992 Tennant et al. .......... 361/106

OTHER PUBLICATIONS

"The Use of Polymeric PTC Devices in Automotive Wiring Systems", Malcolm Walsh et al, SAE Technical Paper Series, International Congress and Exposition, Detroit, MI, Mar. 1–5, 1993, pp. 87–94.

"Protecting Automotive Wiring Assemblies with PolySwitch Devices", Raychem Application Bulletin, pp. 1–5. No date.

"Circuit board protection—a vaariety of choices", Warren Yates, *Electronic Products*,Feb. 1993, pp. 23–26.

*Primary Examiner*—Jeffrey A. Gaffin

*Assistant Examiner*—Ronald W. Leja

*Attorney, Agent, or Firm*—Elroy Strickland

[57] ABSTRACT

A method and apparatus for providing electrical protection for circuits that use splice connections between a source of electrical power and wires of respective circuits. The splices provide a common connection of wires to the power source. The splice includes a positive temperature coefficient device in electrical series between the power source and the wires. The positive temperature coefficient device reduces the flow of current to the wires, and to any loads connected to the wires, when an excess amount of current flows through at least one of the wires and the splice. The temperature rise in the positive temperature coefficient device reaches a trip point, and the device remains in a trip state until power fed to the splice is removed.

1 Claim, 1 Drawing Sheet

SHORT CIRCUIT PROTECTED SPLICE CONNECTOR

Figure 1:
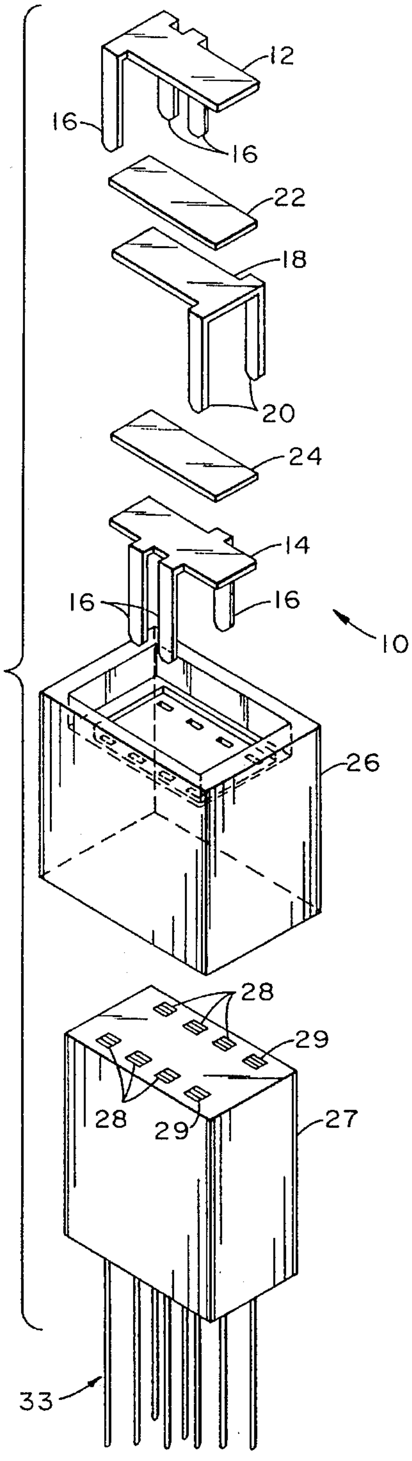

This application is a continuation of application Ser. No. 08/150,967, filed Nov. 12, 1993.

BACKGROUND OF THE INVENTION

The present invention relates generally to circuit protection in motor vehicles, and more particularly to an inexpensive means for eliminating fuse boxes in motor vehicles and the need to funnel circuits needing overload protection to such fuse boxes.

Vehicular wiring must be protected against many potential failure modes. (The terms "vehicular" and "vehicle" are intended to include automobiles, trucks, motorcycles and other apparatus in which electrical splices are used.) One failure mode in vehicles is the possibility that the insulation on any of the many wires in the vehicle will be broken such that the affected wire or wires will short to ground or to other wires or components that may be bare and above ground. The magnitude of the problem is seen in the fact that a modern motor vehicle contains hundreds of circuits using hundreds of feet of insulated wire. Each wire must be protected against faults by using fuses or other circuit protection devices. Such protection devices are sized to handle the sum of the currents through all wires connected to the devices. Further, each wire that carries current provided through its fuse is sized such that the fuse will melt and interrupt before the wire is destroyed. This requires that each wire have a current carrying capability larger than the load connected to the wire requires. This adds to the cost and weight of automotive wiring systems.

There exists in the art self-resettable materials and devices that possess positive temperature coefficient (PTC) characteristics. Such materials and devices are internally structured in a manner that will cause a rise in temperature of the material when excessive current flows through the material. This, in turn, causes the electrical resistance of the material to rise. The rise in resistance reduces the flow of current to a safe condition. Thus, when a fault occurs that causes an increased flow of current sufficient to heat the device, the device increases its temperature and resistance to reduce current flow.

Present technology places PTC devices within switches or loads. These are not optimum schemes because many switches control several different loads. In addition, circuit protection devices require that switches and loads be redesigned to include such devices which involves costly retooling.

BRIEF SUMMARY OF THE INVENTION

The best location for circuit protection devices is the location at which a plurality of wires split off from a single wire to respective loads. Such locations are known as splices, which are distributed throughout a motor vehicle. In the present invention, circuit protection is accomplished using a splice connector provided with internal, automatically resettable protection and designed to be located anywhere in the vehicle. A preferred approach is the use of positive temperature coefficient (PTC) material placed within the splice connector, as discussed in detail below, to protect individual wires connected to terminals of the connector. This allows, in addition, individual wires connected to individual loads to be sized for the currents of the individual loads and provided with optimized lengths since the length of an individual wire to a load need only be the distance from the splice to the load. Further, with the use of such protective splice connectors, existing switches and loads do not need redesigning to incorporate such devices, thereby obviating any necessary retooling involved. In the present invention, one family of splice connectors can serve a multitude of on-vehicle applications.

THE DRAWINGS

Figure 2:
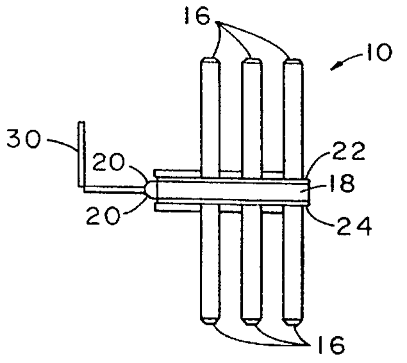
Figure 3:
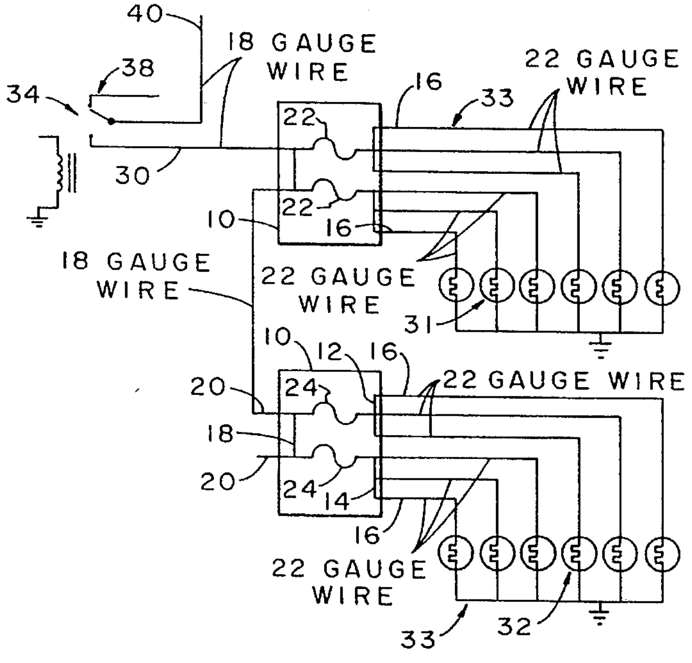

The invention, along with its advantages and objectives, will be better understood from consideration of the following detailed description and accompanying drawing in which:

FIG. 1 is an exploded view of a splice protection device of the invention, the device, as shown, providing electrical protection for six branch circuits, FIG. 2 is a diagrammatic representation of the device of FIG. 1, and FIG. 3 is a schematic representation of twelve branch circuits protected by two splice connectors in accordance with the invention.

PREFERRED EMBODIMENTS

Referring now to FIG. 1 of the drawings, a splice connector 10 is shown in an exploded view of its basic components, which include upper and lower conductive stampings 12 and 14, with each stamping having three integral legs 16, and an intermediate conductive stamping 18 having two integral legs 20. Between the respective stampings are located two planar pieces of material 22 and 24 that exhibit the positive temperature coefficient characteristic discussed above.

The stampings 12, 14 and 18 and planar pieces 22 and 24 are electrically and physically placed together in a sandwich-like structure to form the main body portion of connector 10. The connector can be placed in a hollow container 26 having a main body portion provided with an open end adapted to receive a female connector 27. Female connector 27 has terminals 28 located in the body thereof that engage legs 16 of the stampings when 27 is inserted into 26 for respective connection of the legs to individual loads 31 and 32 (FIG. 3) via insulated branch circuit wires 33 terminating in the female connector. Legs 20 of intermediate stamping 18 are engaged by terminals 29 in connector body 27 to connect the legs to a power feed wire 30, as seen schematically in FIGS. 2 and 3. In this manner, a parallel set of circuits and loads (31 and 32) can be supplied simultaneously with electrical current and voltage via branch wires 33 of FIG. 3.

In further reference to FIG. 3, if the loads 31 and 32 are courtesy lamps, for example, that energize when a vehicle door is opened, a door relay switch 34 is depicted schematically in FIG. 3 that is operated by such a door. Contacts 38 of the relay can be supplied with electrical current through a main fuse or other protection device (not shown) connected to a feed wire 40.

The operation of the arrangements depicted in the drawings is as follows. When relay 34 is energized, current is fed to splice connector 10 via contacts 38 and feed wires 30 and 40, and specifically to the legs 20 of center stamping 18. Current flows through the PTC material of members 22 and 24 to the legs 16 of outer stampings 12 and 14, and to the loads connected to them via female connector 27 and insulated wires 33 extending between connector 10 and the loads. As long as the insulated jackets of wires 33 are intact, current flow to loads 31 and 32 will remain at a proper level so that loads remain energized. If, however, one or more of insulated jackets becomes damaged such that the wire is bared to the extent that it contacts ground, a massive increase in current flow occurs through the bared wire and thus through the PTC material 22 or 24 (depending on which one or more of wires 33 are shorted). The material of 22 or 24 immediately heats and increases its electrical resistance so that current flow to the shorted wire is substantially reduced. The PTC material functions as a latching circuit breaker, i.e., when a fault occurs, the power ($I^2R$) dissipated in the PTC material causes the temperature thereof to rise past a trip point. This causes the resistance of the material to rise to a point in which the $I^2R$ heating equals cooling effects. The PTC material remains in the tripped state until power feed is switched off. The faulted wire can be replaced since its location in the vehicle will be evident from the fact that the load it supplies is not functioning.

The operation of and protection afforded by splice connector 10 is fully automatic so that its replacement is not necessary, as in the case of fuses.

Further, since splice connector 10 supplies a multiplicity of loads from a common power feed (30), the multiplicity of individual wires connecting the multiplicity of loads to the splice connector can be small in gauge and of optimum lengths, thereby substantially reducing the weight and cost of the systems employing connectors 10. In FIG. 3, if loads 31 and 32 are courtesy lamps, a suitable gauge for the individual wires 33 supplying the lamps can be twenty-two, as shown in FIG. 3, while the feed wire gauge can be sixteen. Only one feed wire need extend from the power source to the splice of connector 1 0, and the lengths of branch wires 33 need only be the distance of the connector from the load.

While the invention has been described in terms of preferred embodiments, the claims appended hereto are intended to encompass all embodiments which fall within the spirit of the invention.

What is claimed is:

1. An electrical connector for connecting current receiving ends of a plurality of circuit wires together and to means having a positive temperature coefficient characteristic, comprising:

at least two electrically conductive members each having integral legs for electrical connection respectively to the current receiving ends of a first group of branch circuit wires and to a feed wire supplying electrical current to one of said electrically conductive members, at least one member having a positive, temperature coefficient characteristic disposed between the two electrically conductive members and in electrical contact therewith including the integral legs of the electrically conductive members, a housing for receiving said positive temperature coefficient and electrically conductive members including the legs of the electrically conductive members, one of said electrically conductive members being effective to splice together the current receiving ends of the branch wires and electrically connect said wire ends to the member having a positive temperature coefficient characteristic such that the branch wires are connected to the feed wire through the member having the positive temperature coefficient characteristic when the feed wire is connected to a leg of the other electrically conductive member, and a third electrically conductive member having integral legs, and a second member having a positive temperature coefficient characteristic placed between the third electrically conductive member and one of the two electrically conductive members for splicing current receiving ends of a second group of branch circuit wires to the second positive temperature coefficient characteristic member.

* * * * *